Jan. 8, 1963  H. J. VANDERHAGEN  3,072,383
CABLE PULLING MACHINE
Filed Aug. 1, 1960  2 Sheets-Sheet 2
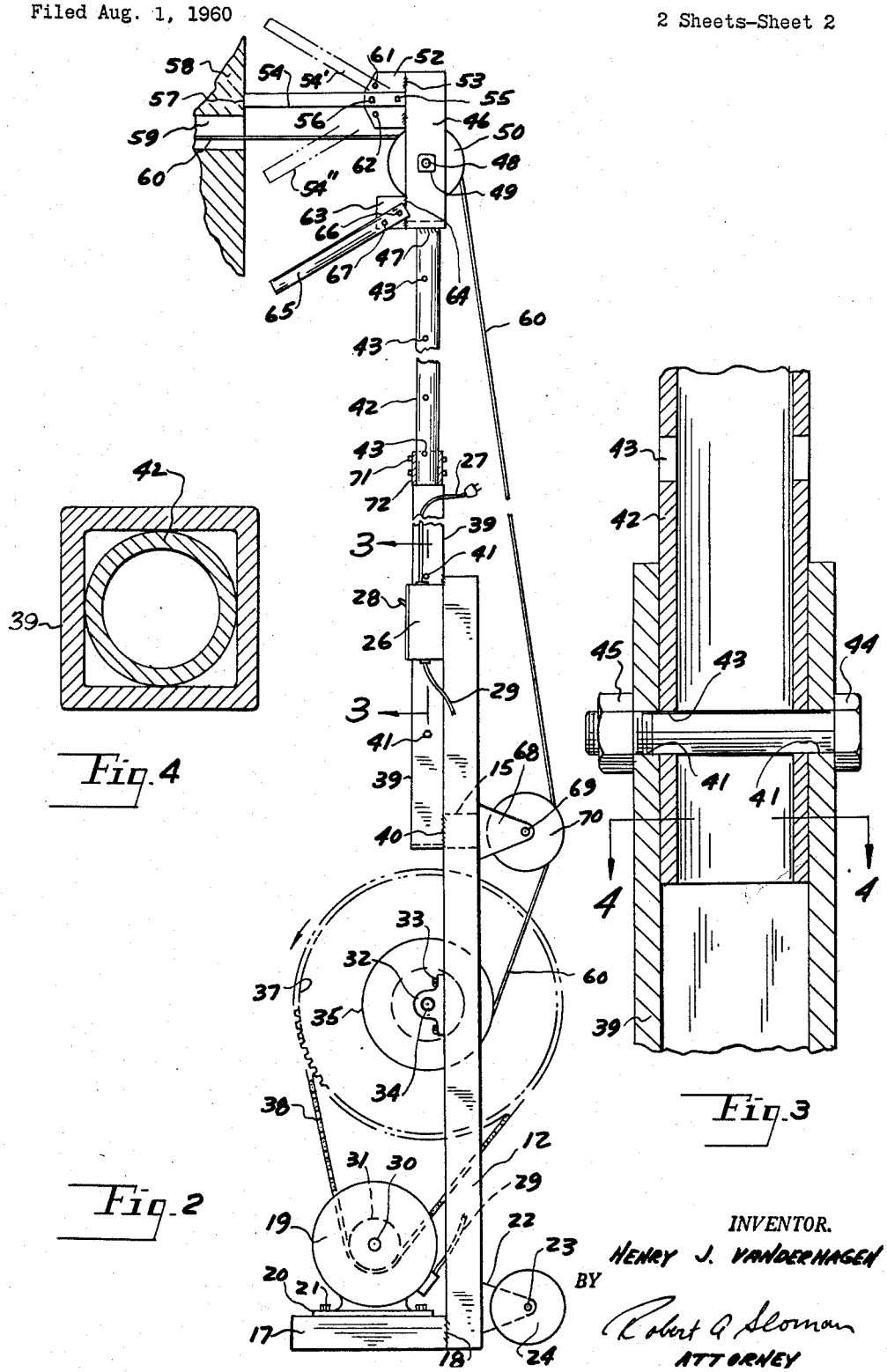
INVENTOR.
HENRY J. VANDERHAGEN
BY
Robert G. Sloman
ATTORNEY

United States Patent Office 3,072,383
Patented Jan. 8, 1963

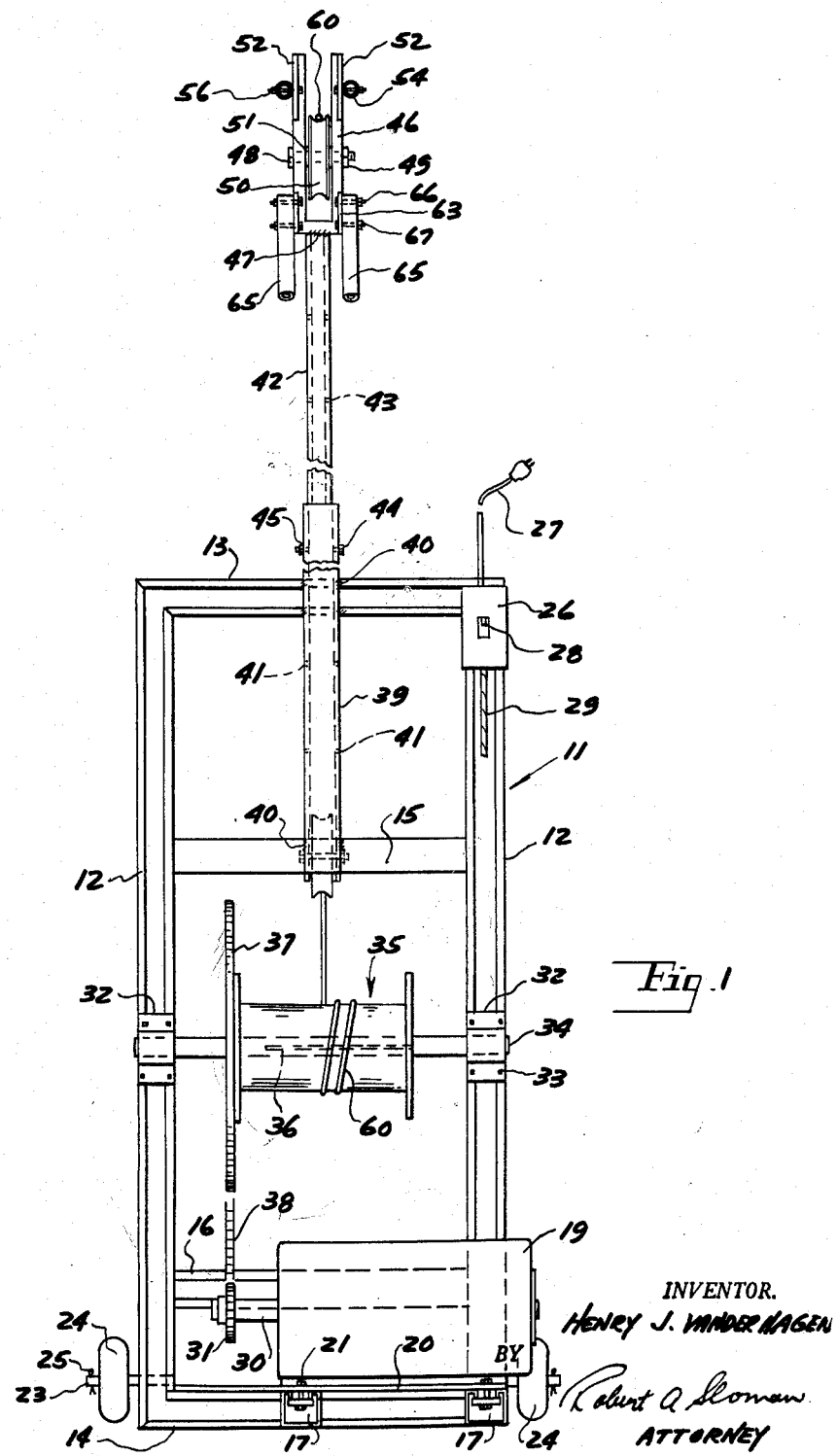

3,072,383
CABLE PULLING MACHINE
Henry J. Vanderhagen, 27321 Princeton Ave.,
St. Clair Shores, Mich.
Filed Aug. 1, 1960, Ser. No. 46,644
1 Claim. (Cl. 254—134.3)

This application relates to a cable pulling machine.

Heretofore, it has been recognized as a difficult practice, namely the pulling of long and heavy cables through conduits, such as electrical work, where an electrical cable may be pulled as much as one hundred feet or more, requiring a strong pulling force. Very often in building construction and otherwise, serious difficulties are encountered in providing the necessary pulling force for this purpose.

It is the object of the present invention to provide a portable cable pulling device which is easily transported from one place to another and which has power operated pulling means, which can exert pulling forces normally required of three or more men in the past.

It is a further object to provide a portable cable pulling device having a longitudinally extendable boom together with means for securing the extension boom in adjusted position.

It is a further object of the present invention to incorporate within the boom end of the cable puller, reaction members for cooperative engagement with a ceiling or a wall or other building projection for taking up the lateral or transverse forces applied to the cable puller during operation.

These and other objects will be seen from the following specification and claim in conjunction with the appended drawings, in which:

FIG. 1 is a fragmentary front elevational view of the broken away for illustration.

FIG. 2 is a right side elevational view thereof, partially broken away for illustration.

FIG. 3 is a fragmentary section taken on line 3—3 of FIG. 2, on an increased scale.

FIG. 4 is a fragmentary section taken on line 4—4 of FIG. 3.

It will be understood that the above drawings illustrate merely a preferred embodiment of the invention, and that other embodiments are contemplated within the scope of the claim hereafter set forth.

Referring to the drawings, the present cable pulling device includes an elongated hollow rectangular frame, generally indicated at 11, and including the spaced upright channels 12 with the top and bottom cross pieces 13—14 fixedly secured thereto, and with the said frame reinforced by the cross braces 15—16, best illustrated in FIG. 1.

The elongated frame 11 has at its lower end a pair of outwardly extending base channels 17 in spaced relation, fixedly secured to the frame by welding as at 18. The electric motor 19 with mounting plate 20 is transversely positioned across and spans the support channels 17 and is fixedly secured thereto by fasteners 21.

Axle supports 22 project rearwardly from the respective frame channels 12, as best shown in FIG. 2 and transversely extended therethrough is the axle shaft 23 carrying the rubber tired wheels 24 retained thereon as at 25. This provides a convenient means of moving the cable pulling device, in the fashion of a wheel barrow.

A switch box 26 is mounted upon an upper portion of the frame and has connected thereto a suitable lead wire 27 adapted for connection to an electric power source and which through control switch 28 transmits that power to the conduit 29 for connection with the electric motor 19 for energizing the same as desired.

Motor 19 has an outwardly projecting shaft 30 carrying the sprocket gear 31. A pair of transversely spaced pillow blocks 32 are mounted upon intermediate portions of the side frames 12 and secured thereto by the fasteners 33. Transverse drum shaft 34 is journaled through and retained with respect to the pillow blocks and has fixedly secured thereon the drum 35 employing a suitable key 36 or other securing means.

A large sprocket gear 37 is axially secured to said drum and is connected with the motor operated sprocket 31 by the sprocket chain 38.

As shown in FIGS. 1 and 2, there is arranged centrally of the frame elements 12 and upright box housing 39 which is square in cross section, for illustration, and which is fixedly secured to the cross member 13, as well as cross brace 15 as by the welds 40, the said box housing 39 projecting above frame 12 centrally thereof and having slidably positioned therein the longitudinally adjustable outrigger shaft 42 having a series of longitudinally spaced transverse apertures 43 therethrough.

Corresponding longitudinally spaced apertures 41 extend transversely through the box housing 39 for the purpose of receiving the outrigger shaft supporting bolt 44 which extends through apertures 41 and corresponding apertures 43 in the said outrigger shaft and is fixedly secured as by the nut 45 or other fastener. This provides a means of telescoping adjustment of the outrigger shaft 42, to any desired height within the limits of the pulling device, after which the said outrigger shaft is fixedly secured within housing 39.

A U-shaped support 46 is mounted transversely across the top of outrigger shaft 42 longitudinally thereof and is fixedly secured thereof as by the welds 47, FIGS. 1 and 2. Support 46 carries a transverse bolt 48 secured thereto at 49 upon which is journaled the top pulley 50, with suitable spacers 51 interposed, adapted to receive the pulling cable 60 as hereafter described.

Adjacent the upper end of the bifurcations of the support 46 are a pair of laterally extending spaced plates 52 suitably secured to the support 46, as by welding as at 53. A pair of spaced tubular reaction arms 54 at their one ends bear against the respective plates 52 and are pivotally secured thereto as by the bolts or other fasteners 55.

In the drawing, as shown, there is a second fastener 56 projected through the corresponding reaction arm 54 and plate 52 for securing the reaction arm 54 to plate 52 and for securing the reaction arm in the horizontal position shown for cooperative engagement with the building structure 58, as at point 57, for illustration. In this illustrative example, the cable pulling device has been brought up adjacent to an upright building wall 58, for illustration, with the said pulling device resting upon its horizontal motor support 17, as best illustrated in FIG. 2 and wherein the upper end of the pulley 50 is in substantial registry with a horizontally disposed aperture 59 through which a suitable conduit, such as an electrical conduit is intended to be pulled employing the pulling cable 60, which is suitably attached to the conduit in a manner which forms no part of the present invention.

In the pulling operation as hereafter described, the reaction to the pulling force exerted by the cable 60 through the motor operation of the drum 35 is taken up by the reaction arms 54 as they engage the building surface 58 as at points 57. Depending upon where the pulling is to take place, or the directional angle of pulling, the said reaction arms 54 may be angularly adjusted.

For example, arms 54 may be angularly adjusted to the dotted line position shown at 54' and secured with respect to plate 52 by the fastener 61, which corresponds to fastener 56. Alternately the reaction arm may be tilted downwardly as indicated at 54" and is secured in position as by the fastener 62. Actually, the numbers 61 and 62 merely represent different positions of the fastener 56, as only one such fastener should be employed in any of the three positions indicated.

The support 46 also has secured thereto adjacent its lower end an additional pair of reaction arms 65 which are of a tubular construction. These arms are pivotally mounted as at 66 upon the respective laterally extending plates 63 which are secured to the support 46 as at points 64. Here the respective arms 65 are anchored in the angular position shown by the additional fastener 67. If the arms 65 are not to be employed, they may be rendered inoperative merely by removing the fastener 67 and permitting the arms 65 to be suspended in an upright position.

As shown in FIGS. 1 and 2, an additional pulley support 68 is provided intermediate the ends of the frame 12 and centrally thereof upon the cross support 15, which journals as at 69 the idler pulley 70 over which the cable 60 extends as it passes therebelow for connection with the power operated drum 35.

Accordingly, for a pulling operation, regardless of the angle of pull, and with the correct reaction arms employed, i.e., the arms 54 or 65 bearing against some portion of the building structure, and with the cable 60 secured to the conduit or other member to be drawn through an aperture in a building, for example, the motor is energized through the control switch 28 for exerting a very effective pull and for efficiently accomplishing the desired result.

The present device is versatile in the sense that the outrigger shaft 42 may be longitudinally adjusted to meet varying situations. While a transverse bolt 44 has been shown for anchoring the outrigger shaft with respect to the box support 41. It is contemplated that alternate or additional means may be employed for securing the outrigger shaft in adjusted position. For this purpose, there is shown in FIG. 2, a securing sleeve 72, which is positioned upon the outrigger shaft at its lowermost point with respect to the housing 39 and fixedly secured to the said shaft by the set screws or other fasteners 71. Accordingly the sleeve 72 is effective to prevent downward movement of the outrigger shaft with respect to the supporting housing 39.

In operation, the cable 60, upon which a pulling action is to be exerted, is threaded over the upper pulley 50, over the intermediate pulley 70 and is connected in the desired fashion to the power rotated drum 35 upon which it may wind under the operation of the motor 19. Accordingly, there is provided in the present invention, a lightweight and portable cable pulling device which is highly efficient in this most difficult job of pulling cables in buildings and in other constructions.

Having described my invention, reference should now be had to the following claim.

I claim:

In a cable pulling machine, an elongated substantially upright L-shaped frame including a right angular support base adapted to rest throughout its length upon a ground surface, a motor mounted on said base, a cable winding drum journaled within said frame intermediate its ends and connected with said motor, an elongated tubular support centrally secured to and extending longitudinally beyond the end of said frame a telescoping outrigger shaft supportedly nested within and longitudinally adjustable upon and projecting from said support, bolts extending through said support and selectively through longitudinally spaced transverse apertures in said shaft for securing the shaft in adjusted position, an upright bifurcated pulley support on the outer end of said shaft, a first pulley journaled within said support, a second pulley aligned with said first pulley mounted on the frame intermediate its ends on the side thereof opposite said motor, a cable wound around and anchored to said drum and movably extending over said pulleys, a pair of reaction arms pivotally connected at their one ends to said pulley support, and a fastener intermediate the ends of each reaction arm selectively secured through one of a series of vertically spaced apertures in said pulley support for determined but variable angular positions with respect thereto depending upon the direction of pulling pressure, and at their other ends operatively engageable with a building structure for maintaining a spaced relation between said pulley support and building structure, and for transmitting to said building structure a load reaction pressure in opposition to the pulling forces transmitted by said cable.

References Cited in the file of this patent

UNITED STATES PATENTS

| | | |
|---|---|---|
| 506,995 | Gillis | Oct. 17, 1893 |
| 807,878 | Soper | Dec. 19, 1905 |
| 930,480 | Keller | Aug. 10, 1909 |
| 1,144,064 | Roberts | June 22, 1915 |
| 2,344,309 | Koch | Mar. 14, 1944 |
| 2,500,086 | Mintus | Mar. 7, 1950 |
| 2,556,484 | Raney | June 12, 1951 |
| 2,707,615 | Green | May 3, 1955 |
| 2,755,066 | Mallasch | July 17, 1956 |
| 2,892,555 | Hooker | June 30, 1959 |
| 2,934,163 | Ladewski | Apr. 26, 1960 |
| 2,948,510 | Kieser | Aug. 9, 1960 |

OTHER REFERENCES

Publication, "Announcing Junior Powercrat" (dated in U.S. Patent Office, Feb. 8, 1957).